(12) United States Patent
Rossini

(10) Patent No.: US 8,861,079 B1
(45) Date of Patent: Oct. 14, 2014

(54) REAR PROJECTION DISPLAY SCREEN AND DEVICE

(71) Applicant: Commissariat á l'énergie atomique et aux énergies alternatives, Paris (FR)

(72) Inventor: Umberto Rossini, Coublevie (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 0 days.

(21) Appl. No.: 14/290,032

(22) Filed: May 29, 2014

(30) Foreign Application Priority Data

May 29, 2013 (FR) ..................................... 13 54843
May 26, 2014 (EP) ..................................... 14169890

(51) Int. Cl.
*G03B 21/56* (2006.01)
*G03B 21/60* (2014.01)

(52) U.S. Cl.
CPC .................................. *G03B 21/604* (2013.01)
USPC ......................................... 359/460; 359/454

(58) Field of Classification Search
CPC .............................. G03B 21/604; G03B 21/60
USPC .................. 359/460, 456–457, 454
See application file for complete search history.

(56) References Cited

U.S. PATENT DOCUMENTS

| 1,610,423 | A | * | 12/1926 | Cawley | 359/443 |
| 1,759,777 | A | * | 5/1930 | Cawley | 359/454 |
| 6,511,186 | B1 | * | 1/2003 | Burstyn et al. | 359/460 |
| 2011/0096394 | A1 | | 4/2011 | Liu et al. | |
| 2012/0212812 | A1 | * | 8/2012 | Weber et al. | 359/454 |

FOREIGN PATENT DOCUMENTS

| JP | H09230508 | 9/1997 |
| JP | 2004361539 | 12/2004 |
| JP | 2007052451 | 3/2007 |

OTHER PUBLICATIONS

Institut National De La Propriete Industrielle, Rapport de Recherche (Search Report in French language), Feb. 24, 2014 in French priority application.

* cited by examiner

*Primary Examiner* — Christopher Mahoney

(74) *Attorney, Agent, or Firm* — Kevin R. Erdman; Brannon Sowers & Cracraft PC

(57) ABSTRACT

A rear projection display screen, including a film having a surface facing the back of the screen including ridges having a triangular cross-section defining prisms, wherein at least a wall of each of said ridges has an inclination such that the angle of incidence, on said wall, of a light ray normal to the display is equal, to within 5 degrees, to the Brewster angle of the surface of separation formed by said wall.

18 Claims, 3 Drawing Sheets

REAR PROJECTION DISPLAY SCREEN AND DEVICE

CROSS-REFERENCE TO RELATED APPLICATIONS

The present application claims priority under 35 U.S.C. §119 of French Patent Application Serial Number 13/54843, filed May 29, 2013, and European Patent Application Serial Number 14169890.2, filed May 26, 2014, the disclosures of which are incorporated by reference herein.

BACKGROUND OF THE INVENTION

1. Field of the Invention

The present disclosure relates to a rear projection display screen and to a rear projection display device comprising such a screen. More particularly, the present disclosure relates to a rear projection display screen and device capable of being integrated in the passenger compartment of a vehicle.

2. Description of the Related Art

Rear projection designates the projection of images on a surface of a transmissive screen, called the rear surface of the screen hereafter, by convention, for the viewing of images on the opposite surface of the screen, called front surface of the screen hereafter. It has already been provided to use rear projection display devices to provide information in passenger compartments of vehicles, for example, of cars. Such devices may for example be integrated in the central console of a car, or also above this central console. However, rear projection display devices integrated in vehicle passenger compartments are subject to significant constraints. Such devices should in particular be relatively compact, sufficiently directional to avoid light projections towards reflective elements such as the windshield, and generate a light flow and an output contrast which are sufficient to avoid problems of readability when the vehicle is placed under a lighting of high luminosity, for example, from the sun. In particular, problems are posed when the image projected on the screen should be able to be seen under an angle different from the normal to the screen, for example, when the screen is located on the central console of a car and the image should be able to be seen by the driver and/or by a front-seat passenger sitting next to the driver.

SUMMARY OF THE INVENTION

An object of an embodiment is to provide a rear projection display device overcoming all or part of the disadvantages of known rear projection display devices.

Another object of an embodiment is to provide a rear projection display screen overcoming all or part of the disadvantages of known rear projection display screens.

Another object of an embodiment is to provide a rear projection display screen and device enabling to see an image under an angle different form the normal to the screen.

Thus, an embodiment provides a rear projection display screen, comprising a film having a surface facing the back of the screen comprising ridges having a triangular cross-section defining prisms, wherein at least one wall of each of said ridges has an inclination such that the angle of incidence, on said wall, of a light ray normal to the screen is equal, to within 5 degrees, to the Brewster angle of the surface of separation formed by said wall.

According to an embodiment, the prisms have, in cross-section, the shape of isosceles triangles.

According to an embodiment, the base of the prisms defines a continuous surface parallel to the screen.

According to an embodiment, the screen further comprises a layer coating the ridged surface of said film, having a refraction index smaller than the refraction index of said film.

According to an embodiment, the film comprises polyethylene terephthalate.

According to an embodiment, the screen further comprises a diffuser located on the non-ridged surface side of said film.

According to an embodiment, the screen further comprises a rectilinear polarizer located on the non-ridged surface side of said film.

According to an embodiment, the screen further comprises a quarter-wave plate located on the non-ridged surface side of said film.

According to an embodiment, the polarizer is located between said film and the quarter-wave plate.

According to an embodiment, the neutral axes of the quarter-wave plate form an angle of approximately 45 degrees with the polarization direction of the polarizer.

Another embodiment provides a rear projection display device, comprising the above-mentioned screen and a light source capable of projecting an image onto the back of the screen.

According to an embodiment, the angle of incidence of the light projected by the source onto at least one wall of each of said ridges is approximately equal to the Brewster angle of the surface of separation formed by said wall.

According to an embodiment, the light emitted by the source is rectilinearly polarized along a direction parallel to the planes of incidence of the light on said walls.

According to an embodiment, the light projected by the source illuminates the back of the screen under an incidence normal to the screen.

According to an embodiment, the display device further comprises a Fresnel lens between the source and the screen.

The foregoing and other features and advantages will be discussed in detail in the following non-limiting description of specific embodiments in connection with the accompanying drawings.

BRIEF DESCRIPTION OF THE DRAWINGS

The above mentioned and other features and objects of this invention, either alone or in combinations of two or more, and the manner of attaining them, will become more apparent and the invention itself will be better understood by reference to the following description of an embodiment of the invention taken in conjunction with the accompanying drawings, wherein.

Figure 1:
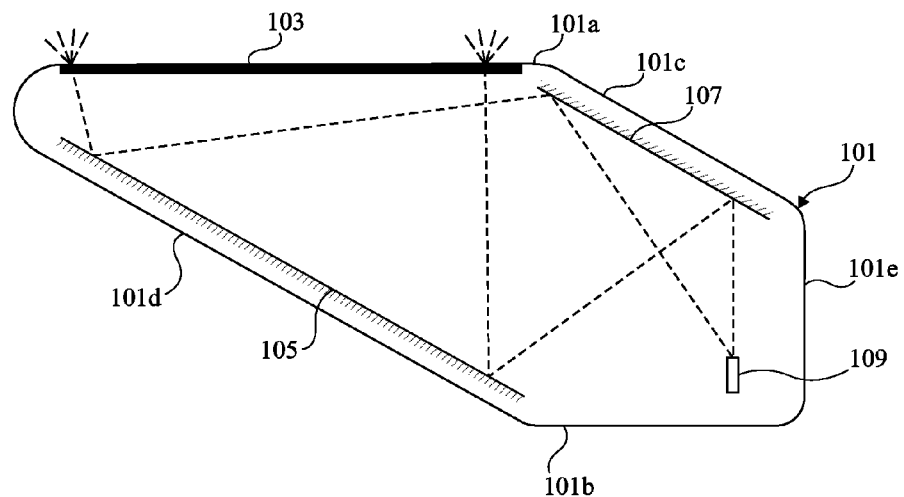
FIG. 1 schematically shows an example of a rear projection display device.

For clarity, the same elements have been designated with the same reference numerals in the different drawings and, further, as usual in the representation of optical systems, the various drawings are not to scale. Thus, corresponding reference characters indicate corresponding parts throughout the several views. Although the drawings represent embodiments of the present invention, the drawings are not necessarily to scale and certain features may be exaggerated in order to better illustrate and explain the full scope of the present invention. The diagrams are also representative in nature, and actual embodiments of the invention may include further features or steps not shown in the drawings. The exemplification set out herein illustrates an embodiment of the invention, in one form, and such exemplifications are not to be construed as limiting the scope of the invention in any manner.

DESCRIPTION OF EMBODIMENTS OF THE PRESENT INVENTION

The embodiment disclosed below is not intended to be exhaustive or limit the invention to the precise form disclosed in the following detailed description. Rather, the embodiment is chosen and described so that others skilled in the art may utilize its teachings.

FIG. 1 is a simplified cross-section view showing an example of a rear projection display device capable of being integrated in the passenger compartment of a vehicle, for example, in the central console of a motor vehicle.

The device of FIG. 1 comprises a package 101 defining an enclosure having integrated projection elements of the device integrated therein. In this example, package 101 has the general shape of a parallelepiped truncated along a plane parallel to one of its edges. In FIG. 1, five walls 101a, 101b, 101c, 101d, and 101e of package 101 can be seen. Wall 101a corresponds to a first surface of the parallelepiped, wall 101b corresponds to a second truncated surface of the parallelepiped, parallel to wall 101a, wall 101c corresponds to a third truncated surface of the parallelepiped, forming an obtuse angle with wall 101a, and wall 101d corresponds to a fourth surface of the parallelepiped, parallel to wall 101c, forming an acute angle with wall 101a. Wall 101e connects wall 101b to wall 101c in the parallelepiped truncating plane and forms, in this example, an approximately straight angle with wall 101b.

Package 101 comprises an outlet opening in wall 101a, having a rear projection display screen 103 positioned therein. The rear surface of screen 103, intended to receive an image projected by a light source, faces the inside of package 101, while its front surface, intended to be seen by a user, is directed towards the outside of the package.

Inside of the package are provided two planar reflective mirrors 105 and 107 respectively positioned along wall 101d and along wall 101c, and a light source 109, for example, a laser source, a miniaturized LED video projector, etc., approximately positioned at the angle between walls 101b and 101e. Source 109 is positioned to illuminate mirror 107, so that the beam reflected by mirror 107 reaches mirror 105 and that the beam reflected by mirror 105 illuminates the rear surface of screen 103. As an example, source 109 is a laser source rotatably mobile along two axes, capable of projecting an image onto the rear surface of screen 103, by scanning, via mirrors 107 and 105. The inclination of mirror 105 according to an acute angle with respect to screen 103 allows a projection with no deformation (a square gives a square) when mirror 105 is placed substantially opposite to screen 103, as shown in FIG. 1.

Figure 2:
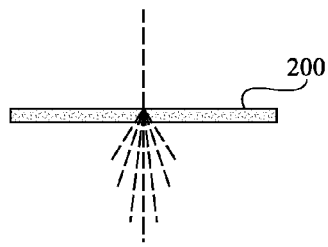
FIG. 2 schematically shows an example of a rear projection display screen.

FIG. 2 is a cross-section view schematically showing an example of a rear projection display screen 200. Screen 200 is essentially formed of a transmissive diffuser, that is, a sheet, plate, or film transmitting to its front surface the light illuminating its rear surface, by more or less strongly diffusing this light. Generally, the outlet cone of the diffuser is centered on the propagation direction of the light illuminating its rear surface, that is, when the diffuser receives, on its rear surface side, a light beam under a normal incidence, the intensity of the beam emitted by the diffuser on its front surface side is maximum in an axis normal to the screen, and decreases as the propagation angle of the diffused light deviates from the normal to the screen.

In a rear projection display device integrated in the central console of the passenger compartment of a vehicle, a problem which arises is that the image should be able to be seen under an angle different from the normal to the screen, for example, by the driver or both by the driver and by a front-seat passenger. When a screen of the type described in relation with FIG. 2 is used, a relatively powerful light source should be provided so that the image perceived by the driver and/or the passenger is sufficiently bright, which results in a significant electric power consumption. Further, since the total power of the flow emitted by the diffuser is relatively high, parasitic reflections capable of disturbing the driver may occur.

Figures 3A, 3B:
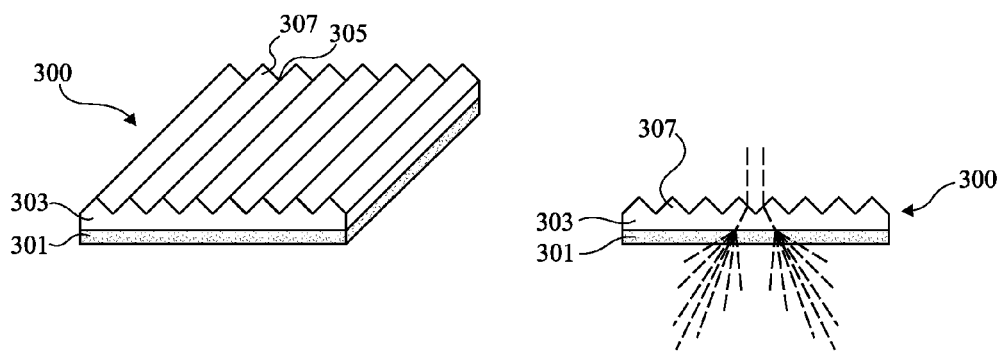
FIGS. 3A to 3C schematically show another example of a rear projection display screen.
Figure 3C:
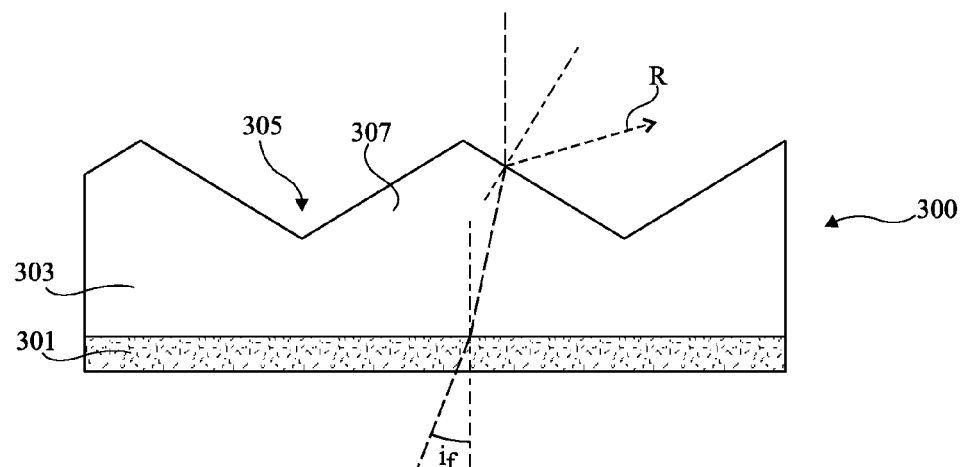

FIGS. 3A to 3C schematically show another example of rear projection display screen. FIG. 3A is a perspective view of the screen, FIG. 3B is a cross-section view of the screen, and FIG. 3C is an enlarged partial cross-section view of the screen. Screen 300 of FIGS. 3A to 3C comprises a transmissive diffuser 301 of the type described in relation with FIG. 2. Screen 300 further comprises, placed against the rear surface of diffuser 301, a transparent sheet 303 having its surface opposite to diffuser 301 (that is, the surface facing the light source or rear surface) comprising ridges 305 having a triangular cross-section defining prisms 307. In the shown example, ridges 305 are parallel and extend across the entire width of screen 300 with a constant pitch. In this example, prisms 307 defined between the lateral walls of ridges 305 are all substantially identical and have, in cross-section, the shape of isosceles triangles. In this example, the bases of prisms 307 (bases of the isosceles triangles) define a continuous planar surface parallel to diffuser 301 and having dimensions substantially identical to those of diffuser 301.

When an image is projected onto the rear surface of screen 300, if the pitch of the prisms is small enough with respect to the image resolution, for each image pixel, part of the light corresponding to the pixel is deviated leftwards by an angle if (in the orientation of FIGS. 3B and 3C), and the remaining part is deviated rightwards by an angle if (in the orientation of FIGS. 3B and 3C). At the output of diffuser 301, the light corresponding to a given pixel of the image is thus distributed between two diffusion cones centered on distinct axes which are not orthogonal to the screen.

The use of a screen with prisms of the type described in relation with FIGS. 3A to 3C in a rear projection display device integrated in the central console of the passenger compartment of a vehicle enables to make the image projected on the screen visible both by the driver and by the passenger, with an improved efficiency between the power emitted by the light source and the luminosity perceived by the user as compared with devices using a screen of the type described in relation with FIG. 2. An advantage is that the total light power emitted at the diffuser outlet can be decreased, which enables to decrease risks of parasitic reflections likely to disturb the driver.

It should be noted that, in a rear projection display device using a screen of the type described in relation with FIGS. 3A to 3C, an optical system (not shown in FIGS. 3A to 3C) enabling to control the angle of incidence of the light projected on the screen, for example, a Fresnel lens, may be provided between the projection elements and the rear surface of the screen.

A disadvantage of a rear projection display device using a screen of the type described in relation with FIGS. 3A to 3C is that part R of the light projected on the back of the screen is reflected by the lateral surfaces of prisms 307. Given the compactness of rear projection display devices integrated in vehicle passenger compartments, the light reflected by prisms 307 may be reflected back towards mirrors of the device, and then projected again on the rear surface of the screen, thus degrading the quality of the displayed image and particularly its contrast.

Figure 4:
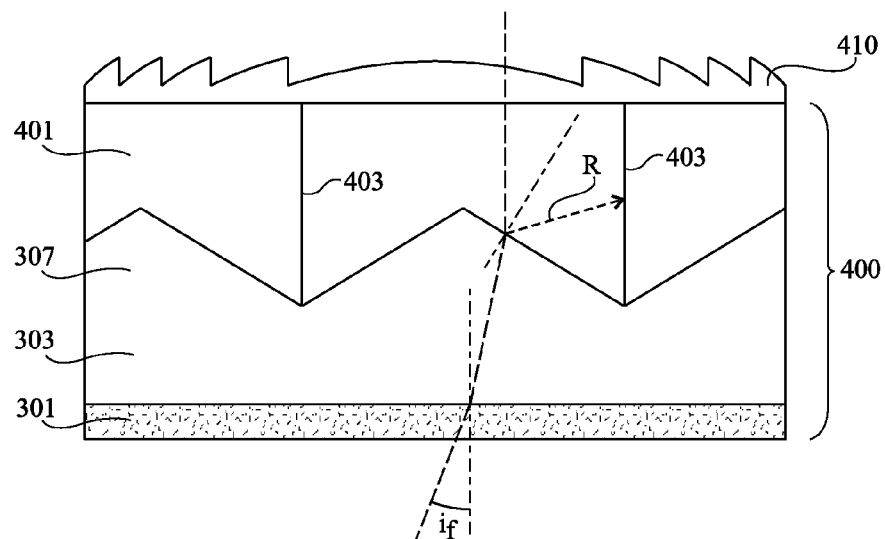
FIG. 4 is a partial simplified cross-section view of an example of a rear projection display device.

FIG. 4 is a partial simplified cross-section view of a rear projection display device comprising another example of rear projection display screen.

Screen 400 of the device of FIG. 4 comprises the same elements as screen 300 of FIGS. 3A to 3C, and further comprises, on the back of sheet 303, a layer 401 made of a material having a different refraction index than sheet 303. On its surface facing the front of the screen, layer 401 takes the shape of the prisms of sheet 303, and, on its surface facing the back of the screen, layer 401 is substantially planar and parallel to diffuser 301.

The display device of FIG. 4 further comprises a Fresnel lens 410 capable of directing the light rays projected by the source (not shown) orthogonally to screen 400. In this example, Fresnel lens 410 is placed against the rear surface of layer 401. Layer 401 thus forms an interface between Fresnel lens 410 and sheet 303, and particularly enables to avoid the presence of air gaps between Fresnel lens 410 and prisms 307 of sheet 303.

To decrease the disadvantages resulting from the partial reflection, on the lateral surfaces of the prisms, of the rays projected by the source, screen 400 comprises, between prisms 307, partitions 403 made of an opaque material, extending in layer 401 orthogonally to the screen plane (across the entire thickness of layer 401 in the shown example). Partitions 403 block the parasitic light reflected by the prisms, and have a low impact on the incident light since the beam projected on the screen is collimated orthogonally to the screen by Fresnel lens 410.

However, a disadvantage is that partitions 403 are relatively complex to form.

Figure 5:
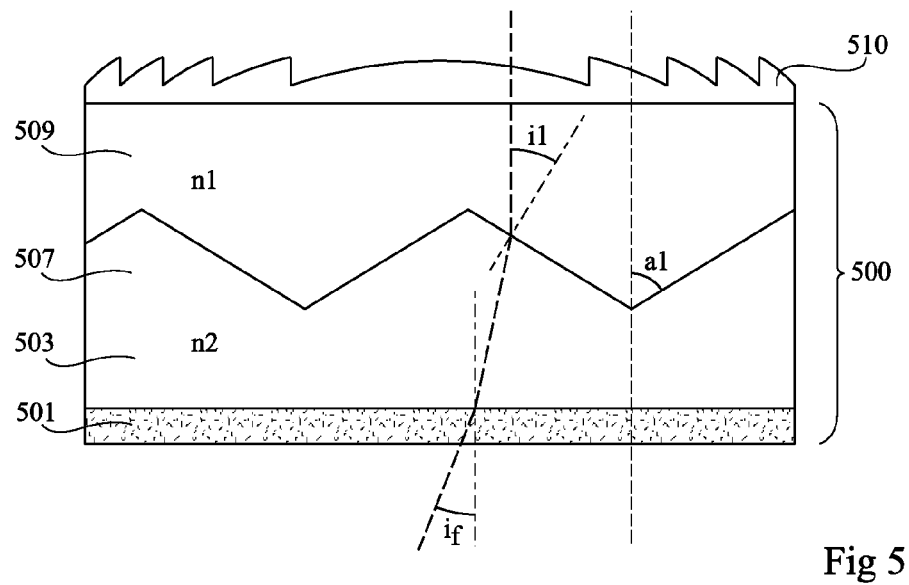
FIG. 5 is a partial simplified cross-section view of an embodiment of a rear projection display device.

FIG. 5 is a partial simplified cross-section view illustrating an embodiment of a rear projection display device. In particular, FIG. 5 comprises a partial simplified cross-section view of an embodiment of a rear projection display screen.

Screen 500 of the display device of FIG. 5 comprises a transmissive diffuser 501. As an example, diffuser 501 may be a cylindrical lenticular diffuser of the type described in article "A dual-directional light-control film with a high-sag and high-asymmetrical-shape microlens array fabricated by a UV imprinting process" of Ta-Wei Lin et al. The provision of such a diffuser has the advantage of decreasing speckle phenomena when the light source of the display device is a source of strong light coherence, for example, a laser source. Other types of diffusers may however be used, for example, a diffuser of the type sold by LUMINIT under name "Light Shaping Diffuser".

Screen 500 thus comprises, placed against the rear surface of diffuser 501, a transparent sheet 503 having its surface opposite to diffuser 501 (or rear surface) comprising ridges with a triangular cross-section defining prisms 507. In the shown example, the ridges are parallel and extend across the entire width of screen 500, with a constant pitch. In this example, prisms 507 defined between the lateral walls of the ridges are all substantially identical and have, in cross-section, the shape of isosceles triangles. In this example, the bases of prisms 507 define a continuous planar surface parallel to diffuser 501 and having dimensions substantially identical to those of diffuser 501. As an example, the pitch between neighboring prisms, corresponding in this example to the width of the prism base, may be in the range from 50 to 500 micrometers. Sheet 503 is for example a sheet made of or containing polyethylene terephthalate, or PET, embossed on its rear surface side according to a pattern corresponding to the shape of prisms 507. Other materials and/or forming methods may however be provided to form prisms 507. As an example, prisms 507 may be formed by etching. A thin layer of glue, not shown, may be provided between the rear surface of diffuser 501 and the front surface of sheet 503.

Screen 500 further comprises, on the back of sheet 503, a layer 509 of a material having a refraction index n1 different from and preferably smaller than refraction index n2 of sheet 503, for example, a glue or a coating or encapsulation material. As an example, sheet 503 is a sheet of PET having an index n2=1.65, and layer 509 is made of a polymer sold under trade name MY-133V-2000, of index n1=1.33. On its front surface side, layer 509 takes the shape of the triangle surface of sheet 503, and, on its rear surface side, layer 509 is approximately planar and parallel to diffuser 501.

In the example of FIG. 5, the display device further comprises an optical system 510 capable of controlling the angle of incidence, on screen 500, of the light rays projected by the source (not shown). In this example, optical system 510 is such that all the light rays projected by the source reach the rear surface of the screen under an approximately normal incidence (orthogonally to diffuser 501). In this example, optical system 510 comprises a Fresnel lens placed against the rear surface of layer 509. Layer 509 forms an interface between Fresnel lens 510 and sheet 503, and especially enables to avoid the presence of air gaps between Fresnel lens 510 and prisms 507.

According to an aspect, the inclination of the lateral surfaces of prisms 507 of screen 500 is such that the coefficient of the reflection, on the lateral surfaces of the prisms, of a ray reaching the rear surface of the screen under a normal incidence and rectilinearly biased along a direction parallel to the plane of incidence of the ray on the lateral surfaces of the prisms (that is, with a so-called p-type biasing with respect to the planes of the lateral surfaces of the prisms), is approximately zero, for example, smaller than 0.5 percent and preferably smaller than 0.1%. In other words, the inclination of the lateral surfaces of prisms 507 with respect to the screen plane is such that the angle of incidence, on the lateral walls of the prisms, of a ray reaching the rear surface of the screen under a normal incidence, is approximately equal, for example, equal to within 5 degrees, and preferably equal to within 1 degree, to the Brewster angle of the surface of separation formed at the interface between layer 509 and the lateral walls of prisms 507.

The reflection of the p polarization on the lateral surfaces of prisms 507 is suppressed when:

$$n1*\cos(i2)=n2*\cos(i1),$$

where i1 designates the angle of incidence of the light rays projected by the source on the lateral surfaces of the prisms, and i2 designates the angle of refraction of the rays by the surface of separation formed between layer 509 and the lateral surfaces of prisms 507.

In the display device of FIG. 5, the light rays projected by the source reach the screen under a normal incidence. Thus, by construction, angle i1 is equal to 90°−a1, where a1 designates the angle formed between the planes of lateral surfaces of prisms 507 and a straight line normal to the screen. Angle i2 being defined by relation:

$$n2*\sin(i2)=n1*\sin(i1),$$

angle a1 for which the reflection of the p polarization is zero is such that:

$$n1*\cos\left(\arcsin\left(\frac{n1}{n2}*\cos(a1)\right)\right)=n2*\sin(a1).$$

Angle if of deviation, by the prisms, of the light projected by the source onto the rear surface of the screen, is then imposed and provided by formula:

$$i_f=\arcsin\left(n2*\cos\left(a1+\arcsin\left(\frac{n1}{n2}*\cos(a1)\right)\right)\right).$$

In the case of a device intended to be integrated in the central console of an automobile vehicle, it is preferably provided to use a sheet 503 and a layer 509 of respective indexes n2 and n1 enabling to obtain an angle if adapted to the visualization of the image both by the driver and by the front-seat passenger, for example, an angle in the range from 10 to 30 degrees.

In the above example where indexes n1 and n2 are respectively equal to 1.33 and 1.65, an angle a1 in the order of 50 is obtained for the construction of the prisms, and an angle if of deviation of the light projected by the prisms of approximately 15 degrees (partly towards the left and partly towards the right) with respect to the normal to the screen is obtained.

According to another aspect, the light source (not shown) of the display device of FIG. 5 emits light rectilinearly p polarized with respect to the lateral surfaces of prisms 507. The light source may be a polarized light video projector, a laser source, or any other light source capable of emitted polarized light. The display device of FIG. 5 may have a configuration of the type described in relation with FIG. 1, or any other configuration (with or without mirrors) enabling to project an image onto the rear surface of screen 500.

Thus, the display device of FIG. 5 advantageously enables to suppress any reflection, on the lateral surfaces of prisms 507, of the light projected by the source.

Another advantage of the device of FIG. 5 is that screen 500 comprises no opaque partitions between the lateral surfaces of the prisms, and is thus easier to form than screen 400 of the device of FIG. 4.

Figure 6:
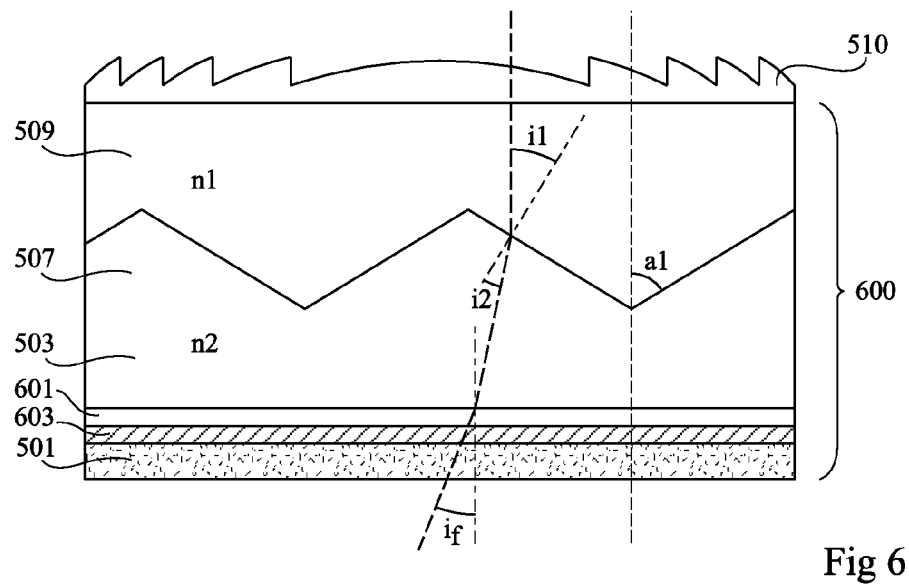
FIG. 6 is a partial simplified cross-section view of an alternative embodiment of the rear projection display device of FIG. 5.

FIG. 6 is a partial simplified cross-section view illustrating an alternative embodiment of the rear projection display device of FIG. 5. The device of FIG. 6 differs from the device of FIG. 5 essentially by the structure of its rear projection screen.

Screen 600 of the device of FIG. 6 comprises the same elements as screen 500 of the device of FIG. 5, and further comprises, between the front surface of sheet 503 and the rear surface of diffuser 501, a polarizer 601 and a quarter-wave plate 603. Polarizer 601 is placed against the front surface of sheet 503 and lets through, in both directions, only the light having the same rectilinear polarization as the light source, that is, a p polarization with respect to the planes of the lateral surfaces of the prisms. Quarter-wave plate 603 is arranged between polarizer 601 and diffuser 501, and is for example oriented so that its neutral axes form an angle of approximately 45 degrees, for example, an angle in the range from 40 to 50 degrees, with the polarization direction of polarizer 601.

Polarizer 601 has no effect on the light originating from the projection light source, since this light is already rectilinearly polarized in the same direction as polarizer 601. Polarizer 601 however enables to filter half the non-polarized light originating from the outside of the display device, for example, from the sun, and likely to on the mirrors of the display device and of degrading the quality of the displayed image and particularly its contrast.

Quarter-wave plate 603 transforms the rectilinear polarization of the light emitted by the source into a circular polarization. This particularly enables to avoid any incompatibility of the device with the use of polarizing glasses, particularly when diffuser 501 is a holographic diffuser, which does not depolarize light.

Specific embodiments have been described. Various alterations, modifications, and improvements will readily occur to those skilled in the art.

In particular, embodiments have been described where prisms 507 have, in cross-section, the shape of isosceles triangles, which enables to distribute the light flow projected by the source partly to the right of the screen and partly to the left of the screen (in the orientation of the drawings). The described embodiments are however not limited to this specific case. As an example, if the light flow projected by the source is desired to be deviated on a single side of the screen, prisms may be provided where one of the lateral surfaces of the prism forms a right angle with its base, the other surface having an inclination capable of suppressing any reflection of the p polarization.

Further, the above-described embodiments are compatible not only with planar screens, but also with screens having curves shapes.

Further, based on the above-described embodiments, it will be within the abilities of those skilled in the art, without showing any inventive step, to add layers, sheets, films, or additional plates to the screen stack, to implement other functions, for example, one or several antireflection layers. As a variation, a holographic diffuser, not shown in the drawings, may be added between Fresnel lens 510 and layer 509 of the screen, to decrease speckle phenomena.

Further, embodiments of screens comprising several stacked elements have been described. The described embodiments are not limited to the above-mentioned embodiments of the various screen elements. It should be understood that each screen element may be made in the form of a sheet, of a layer, or a film, of a plate, etc.

Further, in the described embodiments, orientations parallel or orthogonal to the screen plane have been mentioned. It should be understood that parallel, orthogonal, or normal means, in the present application, approximately parallel or approximately orthogonal, respectively, that is, forming, for example, an angle of more or less 5 degrees with the screen plane or with the normal to the screen, respectively.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

While one or more embodiments of this invention have been described as having an illustrative design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A rear projection display screen, comprising a film having a surface facing the back of the screen comprising ridges having a triangular cross-section defining prism, wherein at least one wall of each of said ridges has an inclination such that the angle of incidence, on said wall, of a light ray normal to the screen is equal, to within 5 degrees, to the Brewster angle of the surface of separation formed by said wall.

2. The screen of claim 1, wherein the prisms have, in cross-section, the shape of isosceles triangles.

3. The screen of claim 2, wherein the base of the prisms defines a continuous surface parallel to the screen.

4. The screen of claim 1, further comprising a layer coating the ridged surface of said film, having a refraction index smaller than the refraction index of said film.

5. The screen of claim 1, wherein said film comprises polyethylene terephthalate.

6. The screen of claim 1, further comprising a diffuser located on the non-ridged surface side of said film.

7. The screen of claim 1, further comprising a rectilinear polarizer located on the non-ridged surface side of said film.

8. The screen of claim 7, wherein the polarizer is located between said film and the quarter-wave plate.

9. The screen of claim 7, wherein the neutral axes of the quarter-wave plate form an angle of approximately 45 degrees with the polarization direction of the polarizer.

10. The screen of claim 1, further comprising a quarter-wave plate located on the non-ridged surface side of said film.

11. The screen of claim 10, wherein the polarizer is located between said film and the quarter-wave plate.

12. The screen of claim 11, wherein the neutral axes of the quarter-wave plate form an angle of approximately 45 degrees with the polarization direction of the polarizer.

13. The screen of claim 10, wherein the neutral axes of the quarter-wave plate form an angle of approximately 45 degrees with the polarization direction of the polarizer.

14. A rear projection display device, comprising a screen including a film having a surface facing the back of the screen comprising ridges having a triangular cross-section defining prism, wherein at least one wall of each of said ridges has an inclination such that the angle of incidence, on said wall, of a light ray normal to the screen is equal, to within 5 degrees, to the Brewster angle of the surface of separation formed by said wall, and a light source capable of projecting an image onto the back of the screen.

15. The device of claim 14, wherein the angle of incidence of the light projected by the source on at least one wall of each of said ridges is approximately equal to the Brewster angle of the surface of separation formed by said wall.

16. The device of claim 14, wherein the light emitted by the source is rectilinearly polarized along a direction parallel to the planes of incidence of the light on said walls.

17. The device of claim 14, wherein the light projected by the source illuminates the back of the screen under an incidence normal to the screen.

18. The device of claim 14, further comprising a Fresnel lens between the source and the screen.

* * * * *